United States Patent
Klein et al.

(10) Patent No.: US 6,846,400 B2
(45) Date of Patent: Jan. 25, 2005

(54) CATHODIC ELECTRODEPOSITION COATING AGENTS

(75) Inventors: Klausjoerg Klein, Wuppertal (DE); Erik Bambach, Unterpremstaetten (AT); Manfred Valtrovic, Graz (AT); Helmut Hoenig, Kumberg (AT)

(73) Assignee: E. I. du Pont de Nemours and Company, Wilmington, DE (US)

( * ) Notice: Subject to any disclaimer, the term of this patent is extended or adjusted under 35 U.S.C. 154(b) by 400 days.

(21) Appl. No.: 10/043,745

(22) Filed: Jan. 10, 2002

(65) Prior Publication Data

US 2003/0164298 A1 Sep. 4, 2003

(51) Int. Cl.$^7$ ............................................. C25D 13/10
(52) U.S. Cl. ........................ 204/499; 204/489; 528/288
(58) Field of Search ................................ 204/499, 489; 528/288

(56) References Cited

U.S. PATENT DOCUMENTS

| | | |
|---|---|---|
| 5,098,537 A | 3/1992 | Hirtl et al. |
| 5,338,419 A | 8/1994 | Wehner et al. |
| 5,415,750 A | 5/1995 | Klein et al. |
| 5,646,236 A | 7/1997 | Schafheutle et al. |
| 6,207,731 B1 | 3/2001 | Gam |

FOREIGN PATENT DOCUMENTS

EP    1 008 632 A2    6/2000

OTHER PUBLICATIONS

U.S. Appl. No. 09/440,417, filed Nov. 15, 1999, Honig et al.

*Primary Examiner*—Kishor Mayekar
(74) *Attorney, Agent, or Firm*—Steven C. Benjamin

(57) ABSTRACT

Cathodic electrodeposition coating agent containing 0.1 wt-% to 5 wt-%, based on the resin solids, of at least one polymer having an acid value of 20 to 100 mg KOH/g and a content of lateral and/or terminal aliphatic C5–C14-hydrocarbon radicals of 40 wt-% to 80 wt-%.

10 Claims, No Drawings

CATHODIC ELECTRODEPOSITION COATING AGENTS

FIELD OF THE INVENTION

The invention relates to cathodic electrodeposition coating agents that contain special acidic polymers as an additive.

BACKGROUND OF THE INVENTION

Cathodic electrodeposition coating agents are used mainly in the preparation of anti-corrosive primers on electrically conductive substrates. In particular, when deposited cathodic electrodeposition coating layers are baked, a reduction in edge coverage may occur and, as a consequence thereof, there is reduced edge corrosion protection. To reduce this problem of edge corrosion protection, cathodic electrodeposition coating agents often contain additives that improve edge coverage or corrosion protection of the edges.

Cathodic electrodeposition coating agents also usually contain anti-crater agents added as a preventive measure or after contamination has occurred, as an additive to prevent formation of craters and similar surface defects caused by impurities in the cathodic electrodeposition coating layers.

Cathodic electrodeposition coating agents containing special mixtures of anti-crater agents are known from U.S. Pat. No. 5,098,537 and U.S. Pat. No. 5,415,750. The mixtures of anti-crater agents may be of such a composition that they result in a content of 0.1 wt-% to 2 wt-%, based on the resin solids of the cathodic electrodeposition coating agent, of one or more polyesters having beta-hydroxyalkyl ester groups, an acid value of 0 to 3 mg KOH/g and a weight-average molecular mass of 1000 to 10,000. When the corresponding polyester from Example 5 of U.S. Pat. No. 5,415,750 or from Example 6 of U.S. Pat. No. 5,098,537 is calculated, a content of 40 wt-% of lateral and/or terminal, branched aliphatic C9-hydrocarbon radicals in the polyester molecule is obtained in each case.

The invention is based on the desire arising from practical considerations to keep the number of additives to be added to the cathodic electrodeposition coating agents as small as possible. Surprisingly, it was ascertained that when special acidic polymers are added to cathodic electrodeposition coating agents, both an anti-crater effect and an edge coverage and hence edge corrosion protection improvement is obtained.

SUMMARY OF THE INVENTION

The invention provides, cathodic electrodeposition coating agents that contain 0.1 wt-% to 5 wt-%, based on the resin solids, of at least one polymer having an acid value of 20 to 100 mg KOH/g and containing 40 wt-% to 80 wt-% of lateral and/or terminal aliphatic C5–C14-hydrocarbon radicals.

DETAILED DESCRIPTION OF THE EMBODIMENTS

The at least one polymer contained in an amount of 0.1 wt-% to 5 wt-%, based on the resin solids, in the cathodic electrodeposition coating agents will be called "acidic polymer" hereinafter.

The cathodic electrodeposition coating agents according to the invention are aqueous coating agents with a solids content of, for example, 10 wt-% to 30 wt-%. The solids content is composed of the resin solids content, the acidic polymer content that is essential for the invention, and optionally fillers, pigments and/or other non-volatile conventional paint additives. The resin solids themselves are composed of the cathodic electrodeposition binder(s) and optionally paste resins, crosslinking agents and/or nonionic resins. Paste resins are classed among the binders. The cathodic electrodeposition binders may be self-cross-linking or preferably, externally cross-linking.

For example, the resin solids composition of the cathodic electrodeposition coating agents is:
50 wt-% to 100 wt-% of cathodic electrodeposition binders,
0 wt-% to 40 wt-% of cross-linking agents,
0 wt-% to 10 wt-% of nonionic resins.

The resin solids composition of the cathodic electrodeposition coating agents is preferably:
50 wt-% to 90 wt-% of externally cross-linking cathodic electrodeposition binders,
10 wt-% to 40 wt-% of cross-linking agents,
0 wt-% to 10 wt-% of nonionic resins.

The cathodic electrodeposition binders are binders bearing cationic groups or groups which can be converted to cationic groups, e.g., basic groups, e.g., amino, ammonium, e.g., quaternary ammonium, phosphonium and/or sulfonium groups. Binders with basic groups are preferred, particularly preferably with nitrogen-containing basic groups, such as, primary, secondary and/or tertiary amino groups. These groups may be present in the quaternized form or are converted to cationic groups with a conventional neutralizing agent such as, lactic acid, formic acid, acetic acid, methanesulfonic acid.

The cathodic electrodeposition binders are preferably resins containing primary, secondary and/or tertiary amino groups having amine values, e.g., from 20 to 250 mg KOH/g. The weight average molecular mass of the cathodic electrodeposition binders is preferably 300 to 10,000. As self-cross-linking or preferably externally cross-linking binders, the cathodic electrodeposition binders bear functional groups capable of chemical cross-linking, particularly hydroxyl groups, and have a hydroxyl value of 30 to 300, preferably 50 to 250 mg KOH/g.

The cathodic electrodeposition binders may be converted to the aqueous phase after quaternization or neutralization of at least a part of the basic groups. Examples of cathodic electrodeposition binders include binders, such as, amino (meth)acrylic resins, aminopolyurethane resins, amino group-containing polybutadiene resins, epoxy resin-carbon dioxide-amine reaction products and, in particular, aminoepoxy resins, for example, aminoepoxy resins having terminal double bonds, aminoepoxy resins with primary OH groups. Examples of cross-linking agents include aminoplastic resins, cross-linking agents having terminal double bonds, cross-linking agents having cyclic carbonate groups, polyepoxy compounds, cross-linking agents containing groups capable of transesterification and/or transamidisation, and particularly polyisocyanates that are blocked with compounds containing an active hydrogen group. Examples of compounds with an active hydrogen group include monoalcohols, glycol ethers, ketoximes, lactams, malonic acid esters, acetoacetic acid esters.

The cathodic electrodeposition binders may be converted to a cathodic electrodeposition binder dispersion and may be used as such for the preparation of cathodic electrodeposition coating agents. The preparation of cathodic electrodeposition binder dispersions is known to the skilled person. For example, cathodic electrodeposition binder dispersions may be prepared by conversion of cathodic electrodeposition binders to an aqueous dispersion by neutralization with acid and dilution with water. The cathodic electrodeposition binders may be present in mixture with cross-linking agents and converted together with said cross-linking agents to an aqueous dispersion. Organic solvent, if present, may be removed or reduced to the desired content, for example, by distillation under vacuum, before or after conversion to the aqueous dispersion.

The at least one acidic polymer contained in an amount of 0.1 wt-% to 5 wt-%, based on the resin solids, in the cathodic electrodeposition coating agents has an acid value of 20 to 100, preferably 35 to 50 mg KOH/g. The acidic polymer contains lateral and/or terminal, cyclic, linear and/or branched, in each case aliphatic, preferably linear and/or branched aliphatic C5–C14, preferably, C6–C12 hydrocarbon radicals corresponding to a content of 40 wt-% to 80 wt-%, preferably 60 wt-% to 70 wt-%. The aliphatic hydrocarbon radicals may be saturated hydrocarbon radicals or aliphatic hydrocarbon radicals containing one or more C=C double bonds, preferably not more than one C=C double bond. The acidic polymers may contain only one or at the same time several different types of hydrocarbon radicals conforming with the definition in the molecule. The acidic polymers preferably have a number average molecular mass of 800 to 3000, preferably 1000 to 2500.

The acidic polymers may be prepared by conventional methods of polymer synthesis known to the skilled person, such as, free-radical polymerization, addition and/or condensation reactions. Examples of acidic polymers include corresponding (meth)acrylic copolymers, polyurethanes and polyesters and hybrid polymers derived therefrom, such as, polyester urethanes or (meth)acrylated polyesters. Acidic polyesters, particularly those with a calculated molecular mass of 800 to 2000, preferably 1000 to 1400 are preferably contained as acidic polymer in the cathodic electrodeposition coating agents. It is preferred if the acidic polyesters are substantially free from hydroxyl groups, that is, have an hydroxyl value of <5 mg KOH/g or have no hydroxyl groups.

In the synthesis of the acidic polymers by free-radical polymerization, olefinically unsaturated monomers, for example, with acid groups, particularly carboxyl groups, such as, (meth)acrylic acid, may undergo free-radical copolymerization with corresponding olefinically unsaturated comonomers that include comonomers with an aliphatic C5–C14 hydrocarbon radical. Examples of comonomers that may act as a source of hydrocarbon radicals conforming with the definition in the finished acidic copolymers are the vinyl ester of a branched tertiary C10-alkane monocarboxylic acid (Veova 10®), hexyl(meth)acrylate, n-octyl(meth)acrylate, 2-ethylhexyl(meth)acrylate, decyl(meth)acrylate, dodecyl(meth)acrylate. The skilled person is aware of which polymerization conditions and which olefinically unsaturated comonomers to be copolymerized may be used in which quantity ratio in order to obtain acidic polymers conforming with the definition. Of course, free-radical polymerization may be combined with addition and/or condensation reactions and the addition and/or condensation reactions may take place during or after completion of free-radical polymerization. For example, acid groups and/or aliphatic C5–C14 hydrocarbon radicals may be introduced by reacting a copolymer containing reactive groups and prepared by free-radical polymerization with corresponding compounds which, in addition to one or more acid groups and/or one or more aliphatic C5–C14 hydrocarbon radicals, contain at least one reactive group that is complementary to the reactive groups of the copolymer in terms of an addition or condensation reaction. As an example and for the purpose of explanation, only the introduction of C5–C14 alkyl radicals by addition of C5–C14 alkyl isocyanate to an hydroxy-functional copolymer bearing a corresponding amount of carboxyl groups and prepared by free-radical copolymerisation will be mentioned in this case. A further example is the introduction of C9 alkyl radicals by addition of less than stoichiometric amounts of a glycidyl ester of a branched tertiary C10 alkane monocarboxylic acid (Cardura E 10®) to the carboxyl groups of a carboxy-functional copolymer prepared by free-radical copolymerization.

In the synthesis of the acidic polymers by addition reactions, for example, polyisocyanates may be reacted with corresponding polyols, polyamines and/or aminoalcohols to polyurethanes, polyureas and polyurethane ureas conforming with the definition. The acid groups may be introduced, for example, by incorporation of hydroxycarboxylic acids, such as, dimethylolpropionic acid during polyaddition and/or subsequently by reaction of hydroxyl groups present in the polyadduct with dicarboxylic acid anhydrides with half-ester formation. The aliphatic C5–C14 hydrocarbon radicals may be introduced during polyaddition and/or subsequently, for example, by incorporation of corresponding monoamines, monoalcohols or monoisocyanates with a corresponding aliphatic radical.

In the synthesis of the acidic polymers by condensation reactions, for example, polycarboxylic acids may be polycondensed to acidic polyesters with polyols, optionally, with the incorporation of monocarboxylic acids and/or monoalcohols.

The acidic polyesters contained in preference as the acidic polymer in the cathodic electrodeposition coating agents may be synthesized, for example, by condensation reactions and/or addition reactions by reacting at least one polycarboxylic acid or suitable polycarboxylic acid derivatives, such as, anhydrides or esters, for example, methyl esters, with at least one corresponding further compound selected from polyols, monocarboxylic acids, monoalcohols, epoxy compounds and/or hydroxycarboxylic acids, the starting materials being selected by type and quantity in such a way that the above-mentioned characteristic values (acid value, content of lateral and/or terminal aliphatic C5–C14 hydrocarbon radicals, molecular mass) are obtained for the resulting polyester. Each of the above-mentioned substance groups may include representatives which are suitable for the introduction of the lateral and/or terminal aliphatic C5–C14 hydrocarbon radicals into the acidic polyester. The condensation and/or addition reactions may be carried out by the conventional methods known to the skilled person, for example, in the presence of conventional catalysts and at elevated temperatures of, e.g., 120° C. to 250° C., for example in the melt. Carriers, such as, xylene, may also optionally be added. The starting materials may be reacted with one another to the acidic polyester in a one-step or preferably, multi-step synthesis process.

Examples of polycarboxylic acids that may be used in the synthesis of the acidic polyesters include trimellitic acid, phthalic acid, isophthalic acid, terephthalic acid, tetrahydrophthalic acid, hexahydrophthalic acid, cyclohexanedicarboxylic acid, succinic acid, adipic acid, sebacic acid, azelaic acid, dodecanedicarboxylic acid, maleic acid, fumaric acid. Dodecenylsuccinic acid may be mentioned as an example of a polycarboxylic acid that may be used as a source of lateral and/or terminal aliphatic C12 hydrocarbon radicals in the finished acidic polyester.

Examples of polyols that may be used in the synthesis of the acidic polyesters include glycerol, trimethylolpropane, trimethylolethane, pentaerythritol, dipentaerythritol, ditrimethylolpropane, sorbitol, mannitol, ethylene glycol, 1,2- and 1,3-propylene glycol, butane-1,3-, 1,4-, 2,3-diol, pentane-1,5-diol, hexane-1,6-diol, trimethylhexane diol, diethylene glycol, triethylene glycol, hydrogenated bisphenols, 1,4-cyclohexane dimethanol, neopentyl glycol, butylethylpropane diol, bisphenol A.

Examples of monocarboxylic acids that may be used in the synthesis of the acidic polyesters and which may act as a source of hydrocarbon radicals conforming with the definition in the finished acidic polyester include 2-ethylhexanoic acid, isononanoic acid, decanoic acid, dodecanoic acid, tetradecanoic acid.

Examples of monoalcohols that may be used in the synthesis of the acidic polyesters include cyclohexanol, methylcyclohexanol. Examples of monoalcohols that may be used in the synthesis of the acidic polyesters and may act as a source of hydrocarbon radicals conforming with the definition in the finished acidic polyester include hexanol, 2-ethylhexanol, decanol, nonanol, dodecanol.

Examples of epoxy compounds that may be used in the synthesis of the acidic polyesters include polyepoxy compounds and, in particular, monoepoxides, such as, monoglycidyl ethers or esters. Examples of monoepoxides that may be used in the synthesis of the acidic polyesters include 2-ethylhexylglycidyl ether as a source of lateral and/or terminal aliphatic C8 hydrocarbon radicals or the glycidyl ester of a branched tertiary C10 alkane monocarboxylic acid (Cardura E 10®) as a source of lateral and/or terminal aliphatic C9 hydrocarbon radicals.

Examples of hydroxycarboxylic acids that may be used in the synthesis of the acidic polyesters include 12-hydroxystearic acid, 6-hydroxyhexanoic acid, citric acid, tartaric acid, dimethylolpropionic acid. Where they exist, the corresponding lactones may be used instead of monohydroxycarboxylic acids.

In addition to the binder(s), water and the acidic polymer content and optionally present cross-linking agents, the cathodic electrodeposition coating agents may contain pigments, fillers, solvents and/or conventional paint additives.

Examples of pigments and fillers include the conventional inorganic and/or organic colored pigments and/or special-effect pigments and/or fillers, such as, titanium dioxide, iron oxide pigments, carbon black, phthalocyanine pigments, quinacridone pigments, metal pigments, interference pigments, kaolin, talcum, silica or anti-corrosive pigments. The pigment plus filler/resin solids weight ratio of the cathodic electrodeposition coating agents is, for example, 0:1 to 0.8:1; for pigmented coatings it is preferably from 0.05:1 to 0.4:1.

The pigments and/or fillers may be dispersed in a part of the cathodic electrodeposition binder and then ground in suitable equipment, e.g., a pearl mill, after which the quantity is made up by mixing with the remaining proportion of binder. The cathodic electrodeposition coating agent or bath may then be prepared from this material—after the addition of neutralizing agent, unless this has already been done—by dilution with water (one-component mode of operation).

Pigmented cathodic electrodeposition coating agents or baths may also be prepared by mixing a cathodic electrodeposition binder dispersion and a separately prepared pigment paste (two-component mode of operation). To this end, a cathodic electrodeposition binder dispersion is diluted further with water, for example, and an aqueous pigment paste is then added. Aqueous pigment pastes are prepared by methods known to the skilled person, preferably by dispersing the pigments and/or fillers in paste resins conventionally used for these purposes and known to the skilled person.

In addition to the acidic polymer(s), the cathodic electrodeposition coating agents may optionally contain further additives, for example, in quantity proportions from 0.1 wt-% to 5 wt-%, based on the resin solids. These are, in particular, those of the kind known for cathodic electrodeposition coating agents, for example, wetting agents, neutralizing agents, levelling agents, catalysts, corrosion inhibitors, antifoaming agents, light stabilizers, antioxidants. The additives may be introduced into the cathodic electrodeposition coating agents in any manner, for example, during binder synthesis, during the preparation of the cathodic electrodeposition binder dispersions, by way of a pigment paste, or separately.

The cathodic electrodeposition coating agents may also contain conventional solvents in conventional proportions of, for example, 0 wt-% to 5 wt-%, based on the cathodic electrodeposition coating bath capable of coating. Examples of such solvents include glycol ethers, such as, butyl glycol and ethoxy propanol, and alcohols, such as, butanol. The solvents may be introduced into the cathodic electrodeposition coating agents in various ways, for example, as a constituent of binder or cross-linking agent solutions, by way of a cathodic electrodeposition binder dispersion, as a constituent of a pigment paste or by separate addition.

The cathodic electrodeposition coating agents may be prepared by the known methods for the preparation of cathodic electrodeposition coating baths, i.e., in principle both by means of the one-component and by means of the two-component mode of operation described above.

The preparation of the cathodic electrodeposition coating agents with regard to the introduction of the at least one acidic polymer may take place, for example, in such a way that the at least one acidic polymer is mixed as such or as an aqueous or organic preparation—but not in the form of a neutralized aqueous solution or dispersion—with the other constituents of the cathodic electrodeposition coating agent. The at least one acidic polymer may be added in various ways, for example, from the outset during the preparation of the cathodic electrodeposition coating agents or subsequently to cathodic electrodeposition coating agents inherently capable of coating, for example, immediately before or during the use for cathodic electrodeposition coating.

During the preparation of the cathodic electrodeposition coating agents by the one-component mode of operation, it is possible to operate in such a way that the at least one acidic polymer is present in the presence of the constituents of the cathodic electrodeposition coating agent present in the non-aqueous phase, and is converted with these to the aqueous phase by dilution with water. For example, pigments and/or fillers may be dispersed in a part of the binder and/or cross-linking agent and then ground in suitable equipment, e.g., a pearl mill, after which the quantity is made up by mixing with the remaining proportion of binder and/or cross-linking agent. The at least one acidic polymer may be contained in the binder and/or cross-linking agent used for dispersing and/or for making up the quantity. The cathodic electrodeposition coating agent or bath may then be prepared from the material thus obtained—after the addition of neutralizing agent, unless this has already been done—by dilution with water.

During the preparation of the cathodic electrodeposition coating agents by the two-component mode of operation, it is also possible to operate in such a way that the at least one acidic polymer is present in the presence of the cathodic electrodeposition binder(s) present in the non-aqueous phase and is converted together with these to the aqueous phase—after the addition of neutralizing agent, unless this has already been done—by dilution with water. A cathodic electrodeposition binder dispersion containing the at least one acidic polymer is thus obtained. A pigmented cathodic electrodeposition coating agent or bath may then be prepared from the cathodic electrodeposition binder dispersion thus obtained by mixing with a separate pigment paste. Alternatively, if the two-component mode of operation is used, it is also possible to operate in such a way that an aqueous pigment paste containing the at least one acidic polymer is added to a cathodic electrodeposition binder dispersion. The latter paste may be prepared, for example, by mixing or emulsifying binder and/or cross-linking agent containing acidic polymer with a pigment paste prepared beforehand by dispersing pigments and/or fillers in aqueous paste resin.

The at least one acidic polymer may also be added separately to the cathodic electrodeposition coating agents. For example, it is also possible to carry out the separate addition afterwards, for example, as a corrective additive to cathodic electrodeposition coating baths ready for coating. The at least one acidic polymer may be used as such or as an aqueous or organic preparation, but not in the form of a neutralized aqueous solution or dispersion. For example, the acidic polymers may be used as an organic solution, particularly as a solution in a water-dilutable organic solvent, or, if necessary, they may be converted initially to a water-dilutable form; for example, the separate, particularly subsequent addition may take place as a constituent of an aqueous, for example, separately prepared pigment paste, or the acidic polymers may be added by means of a water-dilutable binder, particularly as a constituent of a cathodic electrodeposition binder dispersion or in an aqueous cathodic electrodeposition paste resin, or with the assistance of suitable emulsifiers.

Cathodic electrodeposition coating layers may be deposited in the usual way from the cathodic electrodeposition coating agents, for example, in a dry layer thickness of 10 μm to 30 μm, onto electrically conductive, for example, metallic substrates connected as the cathode, and baked at object temperatures of, for example, 150° C. to 190° C.

The cathodic electrodeposition coating layers may be provided prior to or after baking with one or more further coating layers, for example, a top coat layer or a multi-layer coating consisting of a surfacer, a base coat and a clear coat layer.

The cathodic electrodeposition coating agents according to the invention are characterised by lack of susceptibility to substances causing surface defects such as craters, and by good edge coverage. The cathodic electrodeposition coating agents are particularly suitable in the motor vehicle sector, for example, for the preparation of anti-corrosive primers on motor vehicle bodies or motor vehicle body parts.

EXAMPLES

Example 1
(Preparation of a Polyester):

266 g (1 mole) of dodecenylsuccinic anhydride were melted and mixed with 130 g (1 mole) of 2-ethylhexanol and 3 g of triphenylphosphine and heated with stirring to 130° C. and reacted until an acid value of 145 mg KOH/g was obtained. The mixture was then cooled to 120° C. 186 g (1 mole) of 2-ethylhexylglycidylether and a further 2.5 g of triphenylphosphine were then added and the mixture reacted at 130° C. until an acid value of <3 mg KOH/g was obtained. A further 266 g of dodecenylsuccinic anhydride and 186 g of 2-ethylhexylglycidylether and 2 g of triphenylphosphine were then added likewise at 130° C. and reacted until an acid value of <3 mg KOH/g was obtained. The polyester had a calculated molecular mass of 1034 and a lateral and/or terminal C8-alkyl radical content of 32.8 wt-% and a C12-alkenyl radical content of 32.3 wt-% (32.8 wt-%+32.3 wt-%=65.1 wt-%).

Example 2
(Preparation of an Acidic Polyester):

The synthesis of Example 1 was repeated. After the acid value of <3 mg KOH/g was obtained, a further 266 g of dodecenylsuccinic anhydride were added at 130° C. together with 2 g of triphenylphosphine and reacted until an acid value of 44 mg KOH/g was obtained. The mixture was then cooled. The acidic polyester had a calculated molecular mass of 1300 and a lateral and/or terminal C8-alkyl radical content of 26 wt-% and a C12-alkenyl radical content of 38.5 wt-% (26 wt-%+38.5 wt-%=64.5 wt-%).

Preparation of Cathodic Electrodeposition Coating Baths 3a-e and 4a-e:

Comparative Example 3a

A cathodic electrodeposition coating bath with a solids content of 18 wt-% was prepared by mixing 4356 g of an aqueous cathodic electrodeposition binder dispersion (Herberts AQUA EC 2000, R 39660 from DuPont Performance Coatings GmbH & Co. KG, Wuppertal) with 1408 g of a cathodic electrodeposition pigment paste (Herberts AQUA EC 2000, R 39661 from DuPont Performance Coatings GmbH & Co. KG, Wuppertal) and dilution with 5236 g of deionized water.

Comparative Example 3b

Example 3a was repeated, 1 wt-%, based on the resin solids of the cathodic electrodeposition coating bath, of the polyester from Example 1 being added by prior addition to the cathodic electrodeposition pigment paste.

Comparative Example 3c

Example 3a was repeated, 2 wt-%, based on the resin solids of the cathodic electrodeposition coating bath, of the polyester from Example 1 being added by prior addition to the cathodic electrodeposition pigment paste.

Example 3d According to the Invention

Example 3a was repeated, 1 wt-%, based on the resin solids of the cathodic electrodeposition coating bath, of the acidic polyester from Example 2 being added by prior addition to the cathodic electrodeposition pigment paste.

Example 3e According to the Invention

Example 3a was repeated, 2 wt-%, based on the resin solids of the cathodic electrodeposition coating bath, of the acidic polyester from Example 2 being added by prior addition to the cathodic electrodeposition pigment paste.

Comparative Examples 4a–c and Examples 4d, 4e According to the Invention

Examples 3a–e were repeated, 0.05 wt-%, based on the finished cathodic electrodeposition coating bath in each case, of Anticorrit RP4107S (from Fuchs Mineralölwerke GmbH, Mannheim) being added to the cathodic electrodeposition binder dispersion by prior addition in order to produce crater-inducing contamination.

In each case, zinc phosphated test panels were coated from the cathodic electrodeposition coating baths 3a–e and 4a–e with cathodic electrodeposition coatings 20 μm thick (coating conditions: 2 minutes at 30° C. with a deposition voltage of 320 V; baking conditions: 20 minutes at 175° C. object temperature). The number of craters per square decimetre was then determined as an average value on several test panels.

Perforated (diameter of perforations 10 mm) degreased, non-phosphated body panels were also coated in a completely similar manner and then exposed to a salt spray mist for 240 hours in accordance with DIN 50 021-SS. The perforation edges were evaluated with regard to edge rust (characteristic values CV 0 to 5; CV 0, edges without rust, CV 1, sporadic rust spots on edges; CV 2, rust spots on less than ⅓ of the edges; CV 3, ⅓ to ½ of the edges covered in rust; CV 4, more than ½ of the edges covered in rust; CV 5, edges completely rusty).

TABLE 1

| Example | Number of craters per square decimeter | Edge rust (CV) |
| --- | --- | --- |
| 3a | 0 | 3 |
| 3b | 0 | 3 |
| 3c | 0 | 3–4 |
| 3d | 0 | 2–3 |
| 3e | 0 | 2 |
| 4a | 85 | 3 |
| 4b | 12 | 3 |
| 4c | 1 | 3–4 |
| 4d | 12 | 2–3 |
| 4e | 1 | 2 |

Crater-free electrocoatings were obtained from non-contaminated electrocoating baths 3a–e. Examples 3d and 3e, both according to the invention formulated with 1 wt.-% or 2 wt.-% of an acidic polyester additive showed improved edge corrosion protection compared with comparative Examples 3a (no polyester additive), 3b (1 wt.-% non-acidic polyester additive) and 3c (2 wt.-% non-acidic polyester additive).

Examples 4a–e were carried out with electrocoating baths contaminated with a crater generating substance. Example 4a (no polyester additive) resulted in a huge number of craters, the number of which was decreased by addition of 1 wt.-% (Examples 4b, 4d) or 2 wt.-% (Examples 4c, 4e) of polyester additive. However, only in the case of examples 4d and 4e, both made according to the invention by formulating with different amounts of an acidic polyester additive, was there also an improvement in edge corrosion protection.

What is claimed is:

1. An aqueous cathodic electrodeposition coating agent comprising a resin solids composition and containing 0.1 wt-% to 5 wt-%, based on the resin solids composition, of an additive consisting essentially of at least one acidic polymer having an acid value of 20 to 100 mg KOH/g and a content of lateral and/or terminal aliphatic C5–C14-hydrocarbon radicals of 40 wt-% to 80 wt-%.

2. The cathodic electrodeposition coating agent of claim 1, wherein the hydrocarbon radicals are aliphatic C6–C12 hydrocarbon radicals.

3. The cathodic electrodeposition coating agent of claim 1, wherein the acid value of the at least one acidic polymer is 35 to 50 mg KOH/g.

4. The cathodic electrodeposition coating agent of claim 1, wherein the content of the hydrocarbon radicals in the at least one acidic polymer is 60 wt-% to 70 wt-%.

5. The cathodic electrodeposition coating agent of claim 1, wherein the hydrocarbon radicals are cyclic, linear and/or branched aliphatic hydrocarbon radicals.

6. The cathodic electrodeposition coating agent of claim 1, wherein the at least one acidic polymer has a number average molecular mass of 800 to 3000.

7. The cathodic electrodeposition coating agent of claim 1, wherein the at least one acidic polymer is selected from the group consisting of (meth)acrylic copolymers, polyurethanes, polyesters and hybrid polymers derived therefrom.

8. The cathodic electrodeposition coating agent of claim 1, wherein the at least one acidic polymer is an acidic polyester.

9. The cathodic electrodeposition coating agent of claim 8, wherein the acidic polyester has a calculated molecular mass of 800 to 2000.

10. A process for cathodic electrodeposition coating of electrically conductive substrates, comprising the step of cathodically depositing a coating on the substrate from the cathodic electrodeposition coating agent of claim 1.

* * * * *